Oct. 4, 1955  D. O. KING ET AL  2,719,521
EMERGENCY SHUTDOWN CONTROLS FOR DIESEL ENGINES
Filed May 11, 1953  3 Sheets-Sheet 3
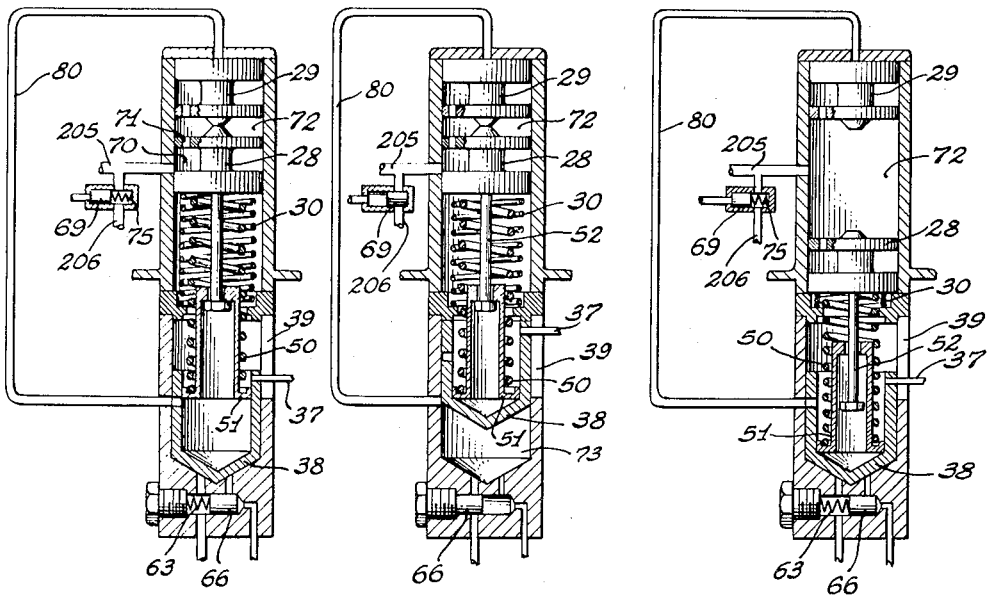
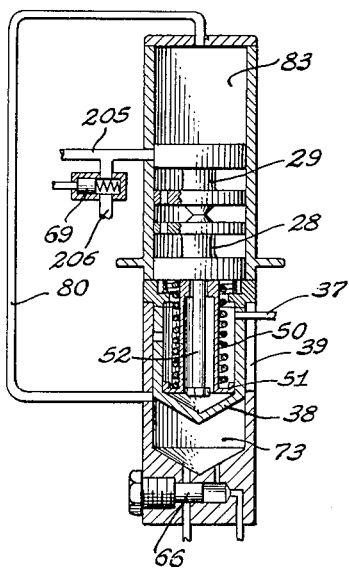
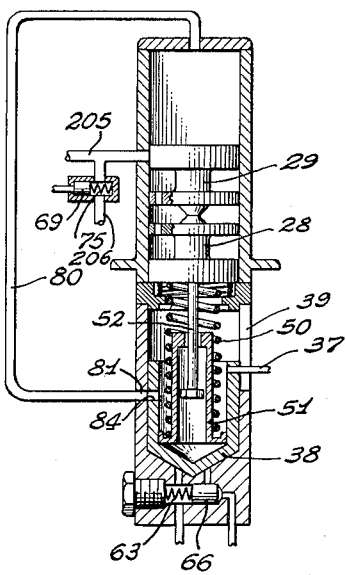
INVENTORS
Daniel O. King
BY Fred R. Lofthouse
Charles M. Fryer
Attorney United States Patent Office 2,719,521
Patented Oct. 4, 1955

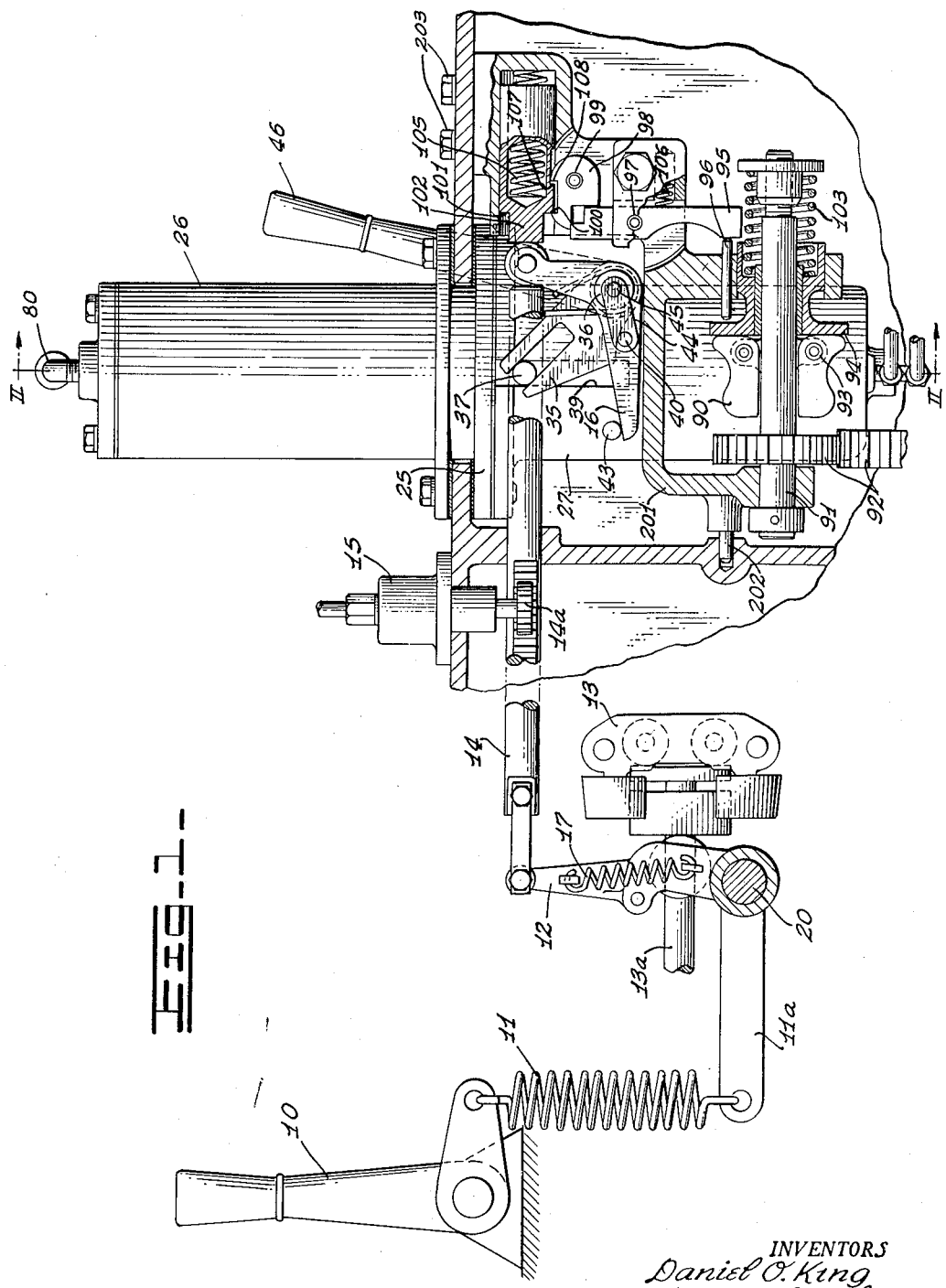

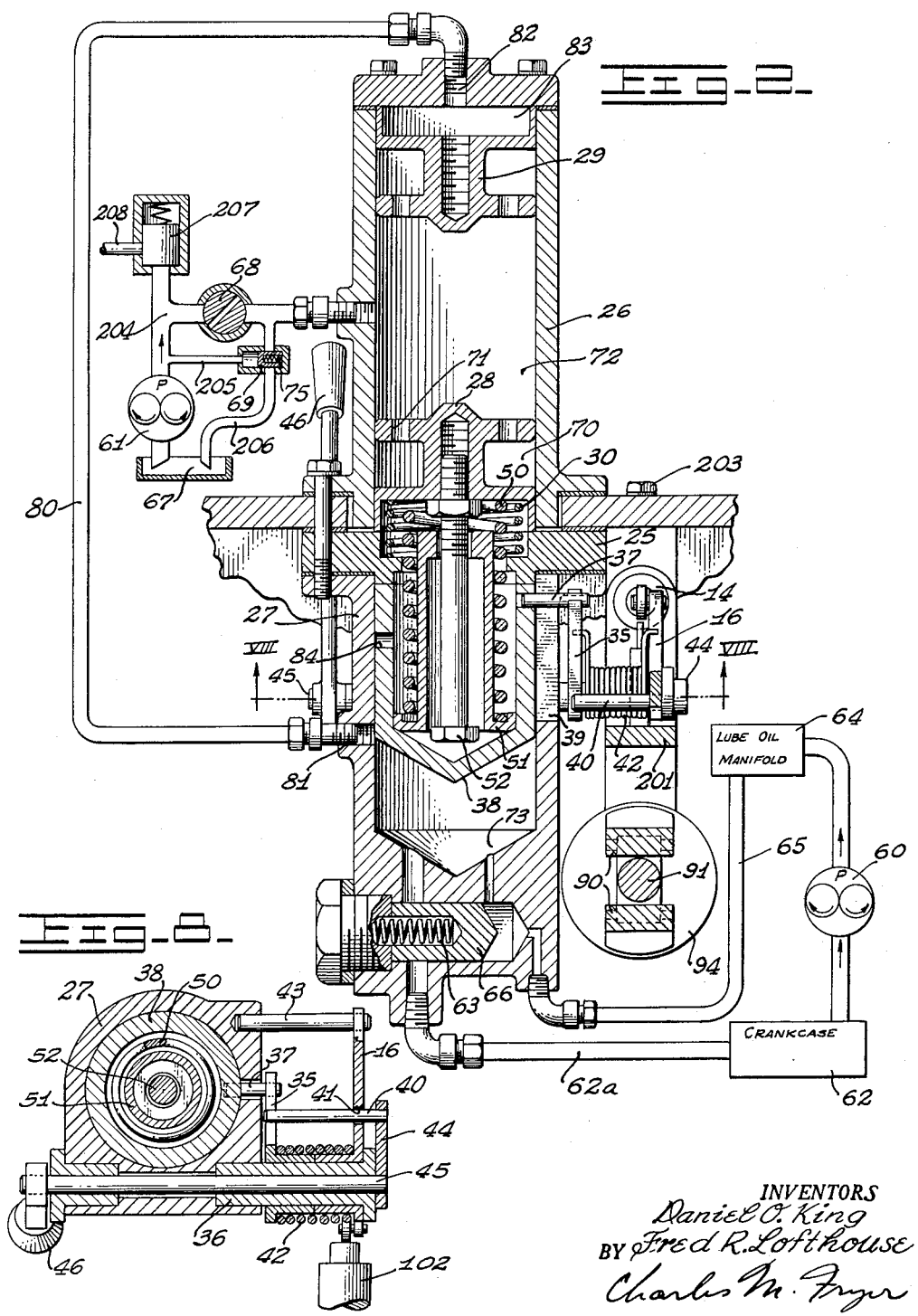

2,719,521

EMERGENCY SHUTDOWN CONTROLS FOR DIESEL ENGINES

Daniel O. King, Pekin, and Fred R. Lofthouse, Manito, Ill., assignors to Caterpillar Tractor Co., Peoria, Ill., a corporation of California Application May 11, 1953, Serial No. 354,372

6 Claims. (Cl. 123—198)

This invention relates to shutdown controls for diesel engines which operate automatically upon emergencies such for example as failure of lubricating oil pressure in the engine or overspeeding of the engine usually caused by some condition that is not controllable by the usual engine governor.

One of the objections to presently used controls operable upon failure of oil pressure is that it is possible to restart an engine after it has been so shut down and to manually reset the oil pressure control. If for some reason the cause of low oil pressure has not been corrected before resetting the shutoff mechanism, the engine will continue to run and the shutoff mechanism will be ineffective even in the absence of oil pressure.

In presently used overspeed governors or automatic overspeed shutoff mechanisms, there is usually a considerable time lag between initial overspeeding and shutting off of the engine so that some damage may be done to the engine before it stops.

It is the object of the present invention to provide a combined mechanism operating as an emergency shutdown in the absence of suitable oil pressure as well as an emergency shutdown upon overspeeding of the engine. A further object of the invention is to provide a low oil pressure shutdown device that resets itself automatically after having functioned but will permit restarting and operation of an engine for only a fraction of a minute unless satisfactory lubricating oil pressure has been reestablished.

A still further object of the invention is to provide an overspeed shut-down mechanism which is quick and positive in its action so that overspeeding is corrected instantly and without time for damage to the engine parts.

Further and more specific objects and advantages of the invention are made apparent in the following specification wherein a preferred form of the invention is described in detail by reference to the accompanying drawings.

In the drawings:

Fig. 1 is a fragmentary view partially in section illustrating the general arrangement of an engine control mechanism of the kind in which a rack bar controlled by a governor is employed to rotate the plungers of a plurality of metering pumps which control delivery of fuel to the combustion chambers of the engine, and also showing the relationship thereto of the emergency shutdown controls of the present invention, Fig. 2 is an enlarged sectional view taken along the line II—II of Fig. 1 illustrating the control mechanism in normal operating position and also schematically illustrating the oil circuits employed therewith, Figs. 3 to 7, inclusive, are schematic views of a portion of the oil pressure control system each showing the positions of the several parts therein under different operating conditions, and Fig. 8 is a sectional view taken along the line VIII—VIII of Fig. 2.

Referring first to Fig. 1 of the drawings, the principal elements of a diesel engine fuel control mechanism are shown as including a control lever 10. A conventional governor spring 11 is connected with the lever 10 and with a lever 11a fixed to a shaft 20 which also carries a two piece lever 12 of the kind disclosed in our assignee's pending application Serial No. 779,565 entitled "Safety Control for Engine Governor," filed October 13, 1947, now Patent No. 2,645,474. A pair of fly weights 13 are carried and rotated by a shaft 13a driven by the engine through means not shown. The lever 12 is connected with a rack bar 14 which meshes with gears 14a on each of a plurality of fuel pumps, one of which is shown at 15. The foregoing structure is conventional and in this structure movement of the rack bar 14 toward the right increases engine speed while movement thereof to the left decreases engine speed and eventually results in shutdown of the engine.

A bell crank 16 contacts one end of the rack bar 14 preferably through an anti-friction roller as shown and movement of this bell crank toward the left as viewed in Fig. 1 in response to engine shutdown mechanism will move the rack bar to the left overcoming the tension of a spring 17 to cock the lever 12 and permit the engine to be shut down. The lever 12 with its spring 17 is herein illustrated as one means for permitting the rack bar 14 to move toward the left to accomplish shutdown of the engine without overcoming the tendency of the main governor with its spring 11 to oppose such motion. There are various other devices for accomplishing this purpose any of which may be used with the present invention.

The oil pressure shutdown mechanism of the present invention includes, as best shown in Fig. 2, an elongated cylinder made up of a central portion 25, an upper portion 26 and a lower portion 27. A pair of pistons 28 and 29 are slidable in the upper portion 26 and are urged toward the top of the cylinder when the engine is shut down under the influence of a spring 30 interposed between the member 25 which has a portion projecting into the cylinder and the lower end of the piston 28. A bifurcated lever 35 (Figs. 1, 2 and 8) is journaled on a hollow stub shaft 36, which extends outwardly from the cylinder portion 27, and embraces a pin 37 carried on a piston 38 also slidable within the lower portion 27 of the cylindrical housing. A slot 39 in the housing permits sliding movement of the pin 37 and rocking of the lever 35 about the shaft 36. The bell crank 16 is also journalled on the shaft 36. A pin 40 extends through a hole 41 in the bell crank 16 and underlies the bifurcated lever 35 so that as the lever 35 rotates in a counterclockwise direction upon downward movement of the piston 38 as viewed in Fig. 1, the lever 16 will also rock in a counterclockwise direction to move the rack bar 14 toward the left or toward a shutdown position.

A torsional spring 42 is disposed between the levers 35 and 16 and has its opposite ends anchored to these levers so as to urge the pin 40 against the lever 35 and the lever 16 against a stop 43 on the housing 27. A link 44 supports the pin 40 at one end and is mounted at its opposite end on a shaft 45 which passes co-axially through the shaft 36. Thus a lever 46 shown in Figs. 1 and 8 which is secured to the opposite end of the shaft 45 may be rocked in a counter-clockwise direction to provide a manual shutdown which overrides the engine governor.

A spring 50 (Fig. 2) is disposed between the lower flange of a retainer 51 and the under surface of the piston 28 and serves to urge the piston 38 downwardly in the absence of oil pressure. This retainer 51 is piloted on a cap screw 52 the upper end of which is threaded into the piston 28. This cap screw acts as a stop to prevent the spring from exerting a downward force on the piston 38 when the piston 28 is in an upward position as shown in Figs. 3 and 4.

The hydraulic circuit for the oil pressure shutdown mechanism is diagrammatically shown in Fig. 2 as comprising a pair of separate engine driven pumps 60 and 61. The pump 60 draws lubricant from the engine crankcase 62 directing it to a lubricating oil manifold 64. From the manifold, the lubricant flows through a conduit 65 to the lower portion 27 of the cylindrical housing which it enters through a spring loaded check valve 66.

Meanwhile the pump 61 is supplying oil under pressure from a separate reservoir 67 to the upper portion 26 of the cylindrical housing through a rotating metering orifice 68, the central element of which is driven by gears not shown which are connected with a convenient moving part of the engine or the pump 61. A spring loaded relief valve 69 permits upward movement of the piston 28 when the engine is shut down as will presently appear.

Before starting the engine, the governor control lever 10 shown in Fig. 1 is rocked in a counter-clockwise direction to tension spring 11 and rock the lever 12 to move the rack bar 14 to the right. This movement of the rack to the right rocks the lever 16 and lever 35 in a clockwise direction about their shaft 36 and raises the piston 38 to the position shown in Fig. 4.

When the engine starts, oil under pressure from the pump 61 is metered through the rotating orifice 68 and enters an annulus 70 which circumscribes the piston 28. This oil flows upwardly through an orifice 71 in the piston into the chamber 72 and thus urges the piston 28 downwardly. The pressure from the pump 61 enters passages 204 and 205, and urges the valve element 69 toward the right to block the return conduit 206. When the piston 28 has reached the lower limit of its travel in the cylinder portion 26, pressure continues to build up in line 204 until a spring loaded valve element 207 is urged upwardly to permit the escape of lubricant to the conduit 208 by means of which it is directed to other conduits (not shown) to serve as a lubricant for other parts such as the governor and the fuel pump camshaft.

As the engine starts, fluid under engine lubricating oil pressure also enters chamber 73 at the lower end of the cylinder through the check valve 66, thus preventing downward movement of piston 38 under influence of the spring 50. When there is a failure of pressure in the engine lubricant system, a spring 63 urges check valve 66 to the right and permits fluid in chamber 73 to return to the engine crankcase through conduit 62a when the spring 50 moves piston 38 downwardly to rock the lever 16 in a counter-clockwise direction to shut the engine down. This of course also results in shut down of the engine driven pump 61. When the pump 61 is no longer delivering fluid under pressure into the conduit 205, a spring 75 urges the valve element 69 toward the left to permit escape of fluid from the chamber 72 through the conduit 206.

As the lubricating oil escapes from the chamber 72, the piston 28 moves upwardly and the preload on spring 50 is reduced so that the piston 38 may be returned to the position shown in Fig. 4 thus resetting the shutdown mechanism automatically for subsequent starting of the engine.

A conduit 80 is disposed between an outlet 81 in the lower end of the cylinder and an inlet 82 in the top of the cylinder in order to permit operation of the engine and the shutoff mechanism in the event of failure of the pump 61. As the engine rack is open and the piston 38 is moved upwardly as disclosed in Fig. 4, the piston 38 uncovers a portion of the outlet 81 and lubricant can flow through the conduit 80 and into a chamber 83 above the piston 29. Under normal conditions with the pump 61 operating, pressure in the chamber 72 is sufficient to hold the piston 29 at the top of the cylinder. However, with the pump 61 inoperative, lubricating oil in the chamber 83 forces the piston 29 and the piston 28 downwardly (Fig. 6) to load the spring 50 of the shutoff mechanism in the manner previously described.

In the event of failure of engine oil pressure, the piston 38 moves downwardly and blocks the inlet 81 but after the piston 38 has moved downwardly as far as possible, an aperture 84 in the wall of a piston 38 registers with the inlet 81 (Fig. 7). Then oil from chamber 83 above piston 29 flows through conduit 80 and aperture 84 into the interior of piston 38 from which it may escape through the slot 39 in the housing. This permits the pistons 28 and 29 to move upwardly to the positions disclosed in Fig. 3.

The several positions occupied by the parts within the cylinder are shown in Figs. 3 to 7, inclusive. In Fig. 3 the parts are illustrated as with the controls in neutral and the engine in a shutdown condition. In this figure, the piston 38 is down and the pistons 28 and 29 are in their uppermost positions. Also the valve 66 is closed and the valve 69 is open.

In Fig. 4 the parts are shown as just after the engine is started with the piston 38 moved upwardly because the lever 10 was advanced to start the engine. Fluid under pressure from pump 60 has moved check valve 66 to the left and fluid under pressure from the pump 61 has moved the valve 69 to the right but there has been no pressure built up in the chamber 72 to load the shutdown spring 50.

Fig. 5 shows the positions of the parts just after an emergency shutdown where the spring 50 has moved the piston 38 downwardly and the rack bar has been moved to its shutdown position. Since the pump 61 is no longer delivering fluid under pressure to chamber 72, the spring 75 has moved the valve 69 to the left thus relieving pressure in the chamber 72 so that the spring 30 will force the piston 28 upwardly to the position shown in Fig. 3.

In Fig. 6, the pump 61 has failed and lubricating oil under pressure in chamber 73 is flowing through the conduit 80 to chamber 83 to hold the pistons 28 and 29 down. Under these circumstances, the piston 38 is in its upward position and valve 66 is open. The valve 69 is open since the pump 61 is not creating pressure but the fluid pressure is not returned to the reservoir 67 because the passage is closed by the piston 29.

In Fig. 7, the valves are shown in an emergency shutdown condition where the piston 38 has moved suddenly downwardly to a position where the port 84 therein registers with the port 81.

The overspeed shutoff mechanism is shown in Fig. 1 as supported by a bracket 201, one end of which is connected to an enclosing housing by a pin 202 and the opposite end of which is secured to the same housing as by cap screws shown at 203. A pair of governor flyweights 90 are carried on a shaft 91 journaled in this bracket and driven at a speed comparable to engine speed through a gear train a part of which is illustrated at 92. As the flyweights 90 move outwardly about their pivots 93 in response to engine speed, they engage and urge a sliding collar 94 toward the right. This collar engages a pin 96 slidably mounted in a part of the bracket 201 and this pin engages the lower end of a lever 95 which is pivoted as at 97. The upper end of the lever 95 normally engages in a notch provided in a pawl 98 which is pivotally mounted as at 99. A latch member 100 formed on the top of the pawl 98 engages a shoulder 101 on a spring loaded piston 102.

With this construction, when the flyweights 90 swing outwardly sufficiently to overcome the preload on a spring 103 which opposes their outward movement, or in other words, when the engine operates at excess speed, the lever 95 is rotated in counter-clockwise direction about its pivot 97 and thus releases the pawl 98 permitting it to swing downwardly and release the plunger 102. The spring 105 of the plunger 102 forces the plunger toward the left as viewed in Fig. 1 thus also swinging the lever 16 toward the left to move the rack bar 14 to its shutdown position without interfering with the setting of the oil pressure shutdown piston 38 or the setting of governor spring 11.

In order to reset the overspeed control, the lever 46 is swung in a clockwise direction and since it is fixed to the shaft 45, the lever 44 and pin 40 move in the same direction thus swinging the bell crank 16 in a clockwise direction to permit rack bar 14 to return to the operating position indicated by the tension on spring 11 and to urge plunger 102 to the right. As plunger 102 moves to the right, a shoulder 107 thereon contacts an upwardly projecting tank 108 of pawl 98 such that further movement of the plunger to the right will rock said pawl in a clockwise direction about pivot 99 permitting spring 106 to rock lever 95 in a clockwise direction about pivot 97 to position the pawl for locking plunger 102 in the position shown in Fig. 1.

We claim:

1. In an emergency shutdown control for an engine having a movable member to control fuel supply, a cylinder, pistons slidably disposed in opposite ends of the cylinder, a spring interposed between the pistons to urge them toward their respective cylinder ends, means effective during normal shutdown condition of the engine to move one said piston away from its end of the cylinder, means to direct engine lubricating oil under pressure to said one end of the cylinder, means to direct oil under pressure to the opposite end of the cylinder to move a second said piston away from the opposite end and compress said spring whereby upon failure of lubricating oil pressure the spring will force the first piston to the end of the cylinder, and a connection between said first piston and said movable member to shut off fuel supply upon movement of the piston.

2. In an emergency shutdown control for an engine having a movable member to control fuel supply, a cylinder, pistons slidably disposed in opposite ends of the cylinder, a spring interposed between the pistons to urge them toward their respective cylinder ends, means effective during normal shutdown condition of the engine to move one said piston away from its end of the cylinder, means to direct engine lubricating oil under pressure to said one end of the cylinder, means to direct oil under pressure to the opposite end of the cylinder to move a second said piston away from the opposite end and compress said spring whereby upon failure of lubricating oil pressure the spring will force the first piston to the end of the cylinder, a connection between said first piston and said movable member to shut off fuel supply upon movement of the piston and means to relieve pressure from said opposite end of the cylinder when engine shut-off occurs.

3. In an emergency shutdown control for an engine having a movable member to control fuel supply, a cylinder, pistons slidably disposed in opposite ends of the cylinder, a spring interposed between the pistons to urge them toward their respective cylinder ends, means effective during normal shutdown condition of the engine to move one said piston away from its end of the cylinder, means to direct engine lubricating oil under pressure to said one end of the cylinder, a second separate means to direct oil under pressure to the opposite end of the cylinder to move a second said piston away from the opposite end and compress said spring whereby upon failure of lubricating oil pressure the spring will force the first piston to its end of the cylinder, and a connection between said first piston and said movable member to shut off fuel supply upon movement of the piston.

4. In an emergency shutdown control for an engine having a movable member to control fuel supply, a cylinder, pistons slidably disposed in opposite ends of the cylinder, a spring interposed between the pistons to urge them toward their respective cylinder ends, means to direct engine lubricating oil under pressure to one end of the cylinder, a second separate means to direct oil under pressure to the opposite end of the cylinder to move a second said piston away from the opposite end and compress said spring whereby upon failure of lubricating oil pressure the spring will force the first piston toward its end of the cylinder, and a connection between said first piston and said movable member to shut off fuel supply upon movement of the piston, a third piston slidably disposed in said opposite end of the cylinder and operable in response to engine oil pressure to move said second piston to compress said spring in the event of failure of said second oil pressure means.

5. In an emergency shutdown control for an engine having a movable member to control fuel supply, a cylinder, pistons slidably disposed in opposite ends of the cylinder, a spring interposed between the pistons to urge them toward their respective cylinder ends, means to direct engine lubricating oil under pressure to one end of the cylinder, a second separate means to direct oil under pressure to the opposite end of the cylinder to move a second said piston away from the opposite end and compress said spring whereby upon failure of lubricating oil pressure the spring will force the first piston to the end of the cylinder, and a connection between said first piston and said movable member to shut off fuel supply upon movement of the piston, a third piston slidably disposed in said opposite end of the cylinder and operable in response to engine oil pressure to move said second piston to compress said spring in the event of failure of said second oil pressure means, and a passage through said first piston to relieve pressure from said opposite end of the cylinder when engine shut off occurs.

6. In an emergency shutdown control for an engine having a movable member to control fuel supply, a cylinder, pistons slidably disposed in opposite ends of the cylinder, a spring interposed between the pistons to urge them toward their respective ends, a connection between one of said pistons and said movable member, means to manually move said one piston to position the control to admit engine lubricating oil into one end of said cylinder and separate means for supplying oil under pressure to the opposite end of said cylinder to overcome said manual setting and move said one piston, connection and movable member to shut off fuel supply upon failure of engine lubricating oil pressure.

References Cited in the file of this patent

UNITED STATES PATENTS

| | | |
|---|---|---|
| 1,339,798 | Thompson | May 11, 1920 |
| 2,471,387 | Cooper | May 24, 1949 |
| 2,551,429 | Eppens | May 1, 1951 |
| 2,611,382 | Kuemmerlein et al. | Sept. 23, 1952 |
| 2,651,316 | Fageol | Sept. 8, 1953 |

FOREIGN PATENTS

| | | |
|---|---|---|
| 466,430 | Great Britain | May 28, 1937 |